United States Patent
Wu

(10) Patent No.: US 7,269,760 B2
(45) Date of Patent: Sep. 11, 2007

(54) SCHEME TO DISCARD AN ERRONEOUS PDU RECEIVED IN A WIRELESS COMMUNICATION SYSTEM

(75) Inventor: Frank Chih-Hsiang Wu, Shindian (TW)

(73) Assignee: Innovative Sonic Limited, Tortola (VG)

( * ) Notice: Subject to any disclaimer, the term of this patent is extended or adjusted under 35 U.S.C. 154(b) by 546 days.

(21) Appl. No.: 10/358,295

(22) Filed: Feb. 5, 2003

(65) Prior Publication Data

US 2004/0153852 A1    Aug. 5, 2004

(51) Int. Cl.
G06F 11/00 (2006.01)
H04J 3/22 (2006.01)

(52) U.S. Cl. .......................... 714/46; 370/282; 370/469
(58) Field of Classification Search .................. 714/43; 370/282, 466, 467, 469
See application file for complete search history.

(56) References Cited

U.S. PATENT DOCUMENTS

| | | | | |
|---|---|---|---|---|
| 6,377,782 | B1* | 4/2002 | Bishop et al. | 455/3.01 |
| 6,584,080 | B1* | 6/2003 | Ganz et al. | 370/315 |
| 6,842,445 | B2* | 1/2005 | Ahmavaara et al. | 370/349 |
| 6,857,095 | B2* | 2/2005 | Suumaki et al. | 714/748 |
| 7,130,295 | B2* | 10/2006 | Kim et al. | 370/349 |
| 2003/0091048 | A1* | 5/2003 | Jiang | 370/392 |
| 2003/0120991 | A1* | 6/2003 | Calle et al. | 714/776 |
| 2004/0199850 | A1* | 10/2004 | Yi et al. | 714/758 |

* cited by examiner

Primary Examiner—Scott Baderman
Assistant Examiner—Joshua Lohn
(74) Attorney, Agent, or Firm—Birch, Stewart, Kolasch & Birch, LLP

(57) ABSTRACT

The present invention provides a method for specifying actions that a receiver takes upon receiving an AM or UM PDU with an error indication. Currently, for RLC acknowledged mode (AM) and unacknowledged mode (UM), upon receiving an AM or UM PDU with an error indication, actions that the receiver takes are not specified. Inappropriate actions that the receiver takes can cause serious problems. For example, unnecessary reset procedures are initiated, unnecessary retransmissions are made, data is lost, or synchronization between the sender and receiver can be lost. In an embodiment of the present invention, for RLC AM, upon receiving an AM PDU with an error indication, the receiver discards this PDU. In another embodiment of the present invention, for RLC UM, upon receiving an UM PDU with an error indication, the receiver discards this PDU. In another embodiment, MAC discards a MAC SDU that is to be delivered to an AM or a UM RLC entity, if an error indication for this SDU has been received from the lower layer. As a result, radio resources are not wasted, unnecessary retransmissions are avoided, synchronization is maintained, and data loss is prevented. Therefore, by utilizing the present invention, wireless communication system performance is improved.

4 Claims, 1 Drawing Sheet

SCHEME TO DISCARD AN ERRONEOUS PDU RECEIVED IN A WIRELESS COMMUNICATION SYSTEM

BACKGROUND OF THE INVENTION

1. Field of the Invention

Figure 1:
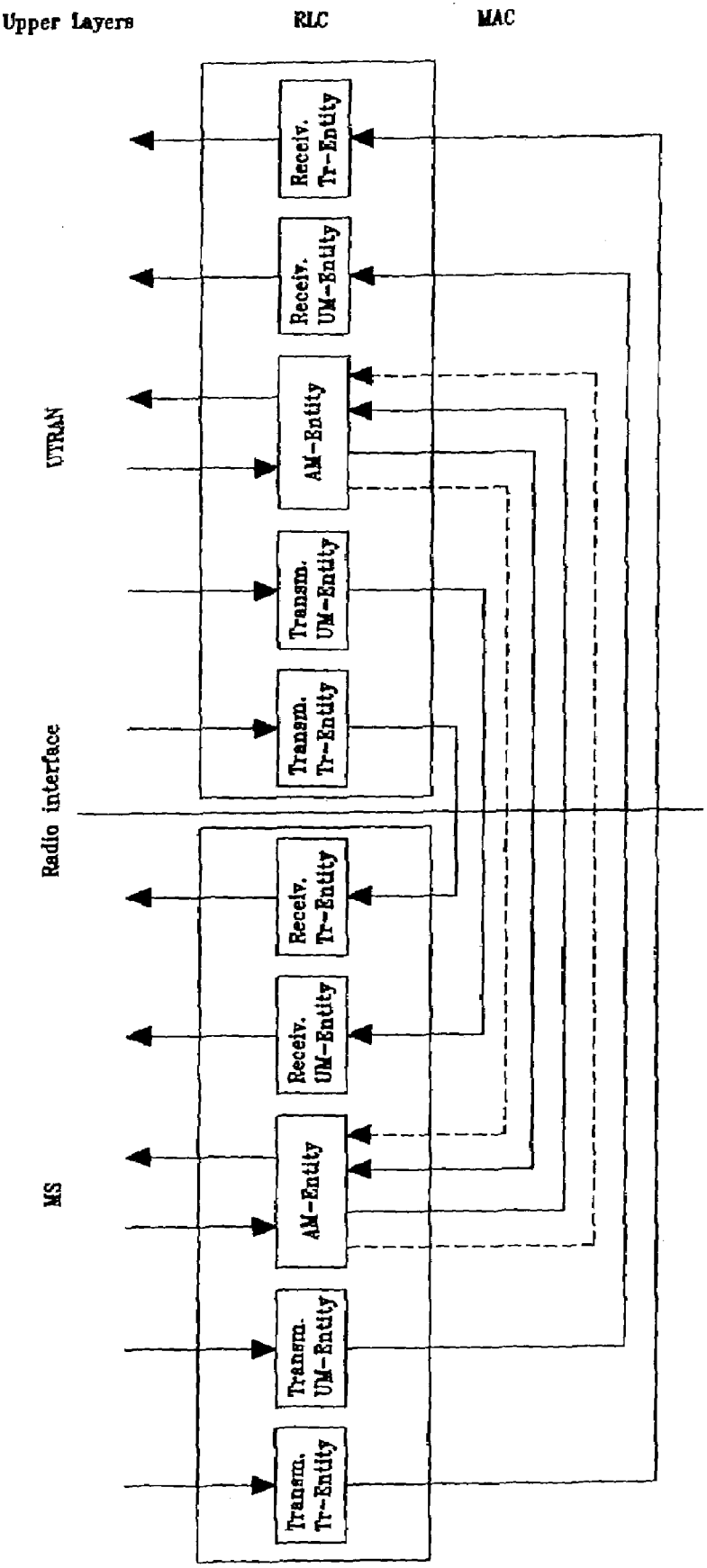

The present invention relates to a wireless communications protocol. More specifically, the present invention discloses a method for specifying actions that the receiver takes upon receiving an acknowledge mode (AM) or unacknowledged mode (UM) protocol data unit (PDU) with an error indication.

2. Description of the Prior Art

Wireless communication is becoming an increasingly common method of communicating. As the demand for wireless service continues to grow, improved wireless communication system performance is increasingly demanded and required.

However, conventional communication systems are limited by the frequency bands allowed for operation. These frequencies are limited by government regulation or by the practical limits of the technology that is available. In order to increase the capacity of the wireless communication systems, more bandwidth must be allocated for the system or the communication system must be used more efficiently. Since the frequency spectrum that can be used is limited by practical and physical limits, an increasing amount of research is being expended to develop means and methods to increase the efficiency of the wireless communication systems.

One way to improve the efficiency of the wireless communication system is to reduce the number of errors or unneccessary retransmissions that waste system resources. Therefore, there is a need for a method that improves wireless communication system performace by reducing errors in the system.

SUMMARY OF THE INVENTION

To achieve advantages and in order to overcome the disadvantages of the conventional method in accordance with the purpose of the invention as embodied and broadly described herein, the present invention discloses a method for specifying actions that the receiver takes upon receiving an AM or UM PDU with an error indication and thereby improves wireless communication system performance.

When a medium access control (MAC) SDU is delivered to an RLC, an error indication is given for the SDU to the RLC if an error indication for the SDU has been received from the lower layer. For RLC transparent mode (TM), upon receiving a transparent mode data (TMD) PDU with an error indication delivered by the MAC, the receiver takes actions according to the following. If "Delivery of Erroneous SDU's" is configured as "no", only the RLC SDU's received without error are delivered to upper layers. Else, if "Delivery of Erroneous SDU's" is configured as "yes", all RLC SDU's are delivered to upper layers, and/or an error indication is provided for each SDU received in error. Otherwise if "Delivery of Erroneous SDU's" is configured as "No detect", all RLC SDU's are delivered to upper layers. The setting for "Delivery of Erroneous SDU's" is configured by upper layers.

Currently, for RLC acknowledged mode (AM) and unacknowledged mode (UM), upon receiving an AM or UM PDU with an error indication, actions that the receiver takes are not specified like RLC TM described above. Inappropriate actions that the receiver takes can cause serious problems. For example, unnecessary reset procedures are initiated, unnecessary retransmissions are made, data is lost, or synchronization between the sender and receiver can be lost.

All of these serious problems such as data loss, loss of synchronization, or unnecessary retransmissions, can occur when the receiver takes inappropriate actions.

Therefore, there is need for an improved scheme for efficiently handling actions taken by a receiver so that inappropriate actions are avoided and wireless communication system performance is improved.

Therefore, the present invention provides a method for specifying actions that the receiver takes upon receiving an AM or UM PDU with an error indication. As a result, radio resources are not wasted, synchronization is maintained, and data loss is prevented. Therefore, system performance is improved.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRITPION OF THE DRAWINGS

The present invention will become more fully understood from the detailed description given hereinbelow and the accompanying drawings which are given by way of illustration only, and thus are not limitative of the present invention, and wherein:

FIG. 1 is a diagram illustrating the layout of the RLC layer.

DESCRIPTION OF THE PREFERRED EMBODIMENTS

Reference will now be made in detail to the preferred embodiments of the present invention, examples of which are illustrated in the accompanying drawings. Wherever possible, the same reference numbers are used in the drawings and the description to refer to the same or like parts.

For the clarity in the following discussion, refer to FIG. 1, which is a diagram illustrating the layout of the RLC layer.

When a medium access control (MAC) SDU is delivered to an RLC, an error indication is given for the SDU to the RLC if an error indication for the SDU has been received from the lower layer. For RLC transparent mode (TM), upon receiving a transparent mode data (TMD) PDU with an error indication delivered by the MAC, the receiver takes actions according to the following. If "Delivery of Erroneous SDU's" is configured as "no", only the RLC SDU's received without error are delivered to upper layers. Else, if "Delivery of Erroneous SDU's" is configured as "yes", all RLC SDU's are delivered to upper layers, and/or an error indication is provided for each SDU received in error. Otherwise if "Delivery of Erroneous SDU's" is configured as "No detect", all RLC SDU's are delivered to upper layers. The setting for "Delivery of Erroneous SDU's" is configured by upper layers.

The RLC maintains, at least the following state variables in the sender. VT(S) is a send state variable which contains the sequence number of the next AMD PDU to be transmitted for the first time. VT(A) is an acknowledge state variable which contains the sequence number following the sequence number of the last in-sequence acknowledged AMD PDU.

The RLC maintains at least the following state variable in the receiver. VR(US) is a receiver send sequence state variable which contains the sequence number following that of the last UMD PDU received.

Currently, for RLC acknowledged mode (AM) and unacknowledged mode (UM), upon receiving an AM or UM PDU with an error indication, actions that the receiver takes are not specified like RLC TM described above. Inappropriate actions that the receiver takes cause serious problems. The following examples are given to illustrate possible problems.

For a first example, consider that the receiver receives an AM PDU with an error indication from MAC. This AM PDU is a STATUS PDU containing an acknowledgement super-field (ACK SUFI) with an erroneous last sequence number (LSN) equal to 100. The correct LSN is equal to 90.

If the LSN is outside the interval [VT(A), VT(S)], an unnecessary reset procedure is initiated, which wastes radio resources.

If the LSN is inside the interval [VT(A), VT(S)], PDU's with Sequence Number (SN) equal to from 90 to 99 are lost forever. Because this erroneous LSN acknowledges the reception of all AMD PDU's with SN less than 100, the sender thinks that PDU's with SN less than 100 are received correctly by the receiver and moves its transmission window accordingly. Later, the receiver will send a STATUS PDU to request the sender to retransmit PDU's with SN equal to from 90 to 99. Because the requested SN's are outside the transmission window, an unnecessary reset procedure is initiated, which wastes radio resources.

For a second example, consider that the receiver receives an AM PDU with an error indication from MAC. This AM PDU is a STATUS PDU containing a BITMAP SUFI with erroneous Bitmap equal to "10011000". The correct Bitmap is "10111011". The error only occurred in the Bitmap field and first sequence number (FSN) equal to 0. According to the erroneous Bitmap value, PDU's with SN equal to 1, 2, 5, 6 and 7 are retransmitted. However, PDU's with SN equal to 2, 6, and 7 were actually correctly received originally. Therefore, radio resources are wasted due to retransmission.

For a third example, consider that the receiver receives an unacknowledged mode data (UMD) PDU with an error indication from MAC. The error only occurred in the SN field in the UMD header of the received UMD PDU. VR(US) is equal to 100 and the erroneous SN is equal to 110. The correct SN is equal to 101. The receiver updates VR(US) to 111 according to the erroneous SN. When the receiver receives the next PDU with SN equal to 102, the receiver thinks that the SN is in the next SN cycle and increments the Hyper Frame Number (HFN) by 1. In fact, this SN is in the current SN cycle. Therefore, the HFN's between the sender and receiver are not synchronized and PDU's received with SN equal to or greater than 102 are not deciphered correctly any more. This is a serious problem because currently there are no mechanisms to solve HFN un-synchronization in RLC UM.

As shown above, serious problems such as data loss, loss of synchronization, or unnecessary retransmissions, can occur when the receiver takes inappropriate actions.

Therefore, there is need for an improved scheme for efficiently handling actions taken by a receiver so that inappropriate actions are avoided and wireless communication system performance is improved.

Therefore, the present invention provides a method for specifying actions that the receiver takes upon receiving an AM or UM PDU with an error indication. As a result, radio resources are not wasted, synchronization is maintained, and data loss is prevented. Therefore, system performance is improved.

In an embodiment of the present invention, for RLC AM, upon receiving an AM PDU with an error indication, the receiver discards this PDU.

In another embodiment of the present invention, for RLC UM, upon receiving a UM PDU with an error indication, the receiver discards this PDU.

In another embodiment, MAC discards an MAC SDU that is to be delivered to an AM or a UM RLC entity, if an error indication for this SDU has been received from the lower layer.

Referring back to the first example above, the receiver receives an AM PDU with an error indication from MAC. This AM PDU is a STATUS PDU containing an acknowledgement super-field (ACK SUFI) with erroneous last sequence number (LSN) equal to 100. The correct LSN is equal to 90.

Previously, if the LSN is outside the interval [VT(A), VT(S)], an unnecessary reset procedure is initiated, which wastes radio resources.

Also, previously, if the LSN is inside the interval [VT(A), VT(S)], PDU's with Sequence Number (SN) equal to from 90 to 99 are lost forever. Because this erroneous LSN acknowledges the reception of all AMD PDU's with SN less than 100, the sender thinks that PDU's with SN less than 100 are received correctly by the receiver and move its transmission window accordingly. Later, the receiver will send a STATUS PDU to request the sender to retransmit PDU's with SN equal to from 90 to 99. Because the requested SN's are outside the transmission window, an unnecessary reset procedure is initiated, which wastes radio resources.

However, utilizing an embodiment of the present invention, upon receiving an AM PDU with an error indication, the receiver discards this PDU. Therefore, unnecessary reset procedures are avoided, thus saving radio resources and improving performance.

Referring back to the second example above, the receiver receives an AM PDU with an error indication from MAC. This AM PDU is a STATUS PDU containing a BITMAP SUFI with erroneous Bitmap equal to "10011000". The correct Bitmap is "10111011". The error only occurred in the Bitmap field and first sequence number (FSN) equal to 0. Previously, according to the erroneous Bitmap value, PDU's with SN equal to 1, 2, 5, 6 and 7 are retransmitted. However, PDU's with SN equal to 2, 6, and 7 were actually correctly received originally. Therefore, radio resources are wasted due to retransmission.

However, utilizing an embodiment of the present invention, upon receiving an AM PDU with an error indication, the receiver discards this PDU. Therefore, unnecessary retransmission of PDU's is avoided, thus saving radio resources and improving performance.

Referring back to the third example above, the receiver receives an unacknowledged mode data (UMD) PDU with an error indication from MAC. The error only occurred in the SN field in the UMD header of the received UMD PDU. VR(US) is equal to 100 and the erroneous SN is equal to 110. The correct SN is equal to 101. Previously, the receiver updates VR(US) to 111 according to the erroneous SN. When the receiver receives the next PDU with SN equal to 102, the receiver thinks that the SN is in the next SN cycle and increments the Hyper Frame Number (HFN) by 1. In fact, this SN is in the current SN cycle. Therefore, the HFN's between the sender and receiver are not synchronized and PDU's received with SN equal to or greater than 102 are not deciphered correctly any more. This is a serious problem because currently there are no mechanisms to solve HFN un-synchronization in RLC UM.

However, utilizing an embodiment of the present invention, upon receiving an UM PDU with an error indication, the receiver discards this PDU.

Alternatively, in another embodiment, MAC discards an MAC SDU that is to be delivered to an AM or a UM RLC entity, if an error indication for this SDU has been received from the lower layer.

Therefore, unnecessary retransmission of PDU's is avoided and loss of synchronization is avoided, thus saving radio resources and improving performance.

As shown above, there is need for an improved scheme for efficiently handling actions taken by a receiver so that inappropriate actions are avoided and wireless communication system performance is improved.

Therefore, the present invention provides a method for specifying actions that the receiver takes upon receiving an AM or UM PDU with an error indication. As a result, radio resources are not wasted, synchronization is maintained, and data loss is prevented. Therefore, system performance is improved.

Note that the embodiments of the present invention described above are only examples for efficiently handling actions taken by a receiver. In other embodiments, various other steps or methods are utilized for handling erroneous PDCP PDU's without deviating from the scope of the present invention of specifying actions taken by a receiver so that inappropriate actions are avoided and wireless communication system performance is improved.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A method for error handling in a receiver of a wireless communication system, wherein the receiver contains at least a medium access control (MAC) layer, a radio link control (RLC) layer, a lower layer, an upper layer, and a configurable setting for Delivery of Erroneous SDUs, the RLC layer containing at least a transparent mode (TM) entity and an acknowledged mode (AM) entity, the method comprising:

the MAC layer delivering MAC SDUs, which are also called RLC PDUs, to the RLC layer with an error indication if an error indication for the MAC SDU has been received from the lower layer;

if the setting for Delivery of Erroneous SDUs is configured as no, the TM RLC entity only delivering RLC SDUs reassembling from RLC PDUs received without error indication to the upper layer;

if the setting for Delivery of Erroneous SDUs is configured as yes, the TM RLC entity delivering all RLC SDUs reassembling from RLC PDUs to the upper layer, and/or an error indication being provided for each SDU reassembling from at least one RLC PDU that was received with the error indication;

if the setting for Delivery of Erroneous SDUs is configured as No detect, the TM RLC entity delivering all RLC SDUs reassembling from received RLC PDUs to upper layers;

the AM RLC entity receiving an RLC PDU with the error indication from the MAC layer; and upon receiving the RLC PDU with the error indication, the AM RLC entity discarding the RLC PDU.

2. The method for error handling of claim 1 wherein the configurable setting for Delivery of Erroneous SDUs is configured by the upper layer.

3. A method for error handling in a receiver of a wireless communication system, wherein the receiver contains at least a medium access control (MAC) layer, a radio link control (RLC) layer, a lower layer, an upper layer, and a configurable setting for Delivery of Erroneous SDUs, the RLC layer containing at least a transparent mode (TM) entity and an unacknowledged mode (UM) entity, the method comprising:

the MAC layer delivering MAC SDUs, which are also called RLC PDUs, to the RLC layer with an error indication if an error indication for the MAC SDU has been received from the lower layer;

if the setting for Delivery of Erroneous SDUs is configured as no, the TM RLC entity only delivering RLC SDUs reassembling from RLC PDUs received without error indication to the upper layer;

if the setting for Delivery of Erroneous SDUs is configured as yes, the TM RLC entity delivering all RLC SDUs reassembling from RLC PDUs to the upper layer, and/or an error indication being provided for each SDU reassembling from at least one RLC PDU that was received with the error indication;

if the setting for Delivery of Erroneous SDUs is configured as No detect, the TM RLC entity delivering all RLC SDUs reassembling from received RLC PDUs to upper layers;

the UM RLC entity receiving an RLC PDU with the error indication from the MAC layer; and upon receiving the RLC PDU with the error indication, the UM RLC entity discarding the RLC PDU.

4. The method for error handling of claim 3 wherein the configurable setting for Delivery of Erroneous SDUs is configured by the upper layer.

* * * * *